United States Patent [19]

Kock

[11] Patent Number: 4,762,907

[45] Date of Patent: Aug. 9, 1988

[54] WHOLLY AROMATIC POLYESTER CARBAMIDES AND THE PREPARATION THEREOF

[75] Inventor: Hans-Jakob Kock, Ludwigshafen, Fed. Rep. of Germany

[73] Assignee: BASF Aktiengesellschaft, Ludwigshafen, Fed. Rep. of Germany

[21] Appl. No.: 938,063

[22] Filed: Dec. 4, 1986

[30] Foreign Application Priority Data

Dec. 4, 1985 [DE] Fed. Rep. of Germany ....... 3542777

[51] Int. Cl.⁴ .................... C08G 63/60; C08G 63/68
[52] U.S. Cl. .................... 528/183; 528/184; 528/193; 528/190; 528/191; 528/125; 528/208
[58] Field of Search ............... 528/183, 184, 193, 190, 528/191, 125

[56] References Cited

U.S. PATENT DOCUMENTS

| | | | |
|---|---|---|---|
| 4,118,372 | 10/1978 | Schaefgen | 528/190 |
| 4,330,457 | 5/1982 | East et al. | 524/602 |
| 4,351,917 | 9/1982 | Calundann et al. | 524/602 |
| 4,355,132 | 10/1982 | East et al. | 524/602 |
| 4,375,530 | 3/1983 | Hay et al. | 524/605 |
| 4,473,681 | 9/1984 | East | 524/601 |

*Primary Examiner*—Harold D. Anderson
*Assistant Examiner*—Frederick Krass
*Attorney, Agent, or Firm*—Keil & Weinkauf

[57] ABSTRACT

Wholly aromatic polyester carbamides which form a liquid-crystalline fiber-forming melt below 300° C. and are composed of (a) not less than 20 mol % of repeat units of the formula I

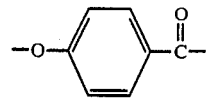

(b) from 5 to 15 mol % of repeat units of the formula II

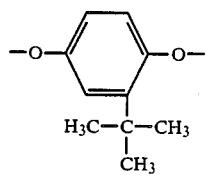

(c) from 5 to 15 mol % of repeat units of the formula III

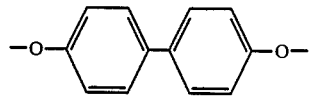

(d) from 1 to 10 mol % of units of the formula IV

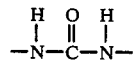

(e) a molar amount corresponding to the total amount of components (b), (c) and (d) of repeat units of the formula V

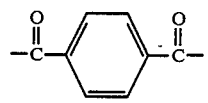

the molar proportions of components (a), (b), (c), (d) and (e) adding up to 100 mol % in each case, the preparation thereof and fibers, films moldings and coatings prepared therefrom.

9 Claims, No Drawings

WHOLLY AROMATIC POLYESTER CARBAMIDES AND THE PREPARATION THEREOF

The present invention relates to wholly aromatic polyester carbamides which form a liquid-crystalline fiber-forming melt below 300° C.

Liquid-crystalline polyester amides are known. However, these polymers are in need of improvement in heat distortion resistances and processability. U.S. Pat. No. 4,355,132 described polyester amides based on naphthalene-dicarboxylic acid, 4-hydroxybenzoic acid, aminophenol and optionally isophthalic acid and hydroquinone. However, these polymers have glass transition temperatures around 110° C. U.S. Pat. No. 4,330,457 described polyester amides based on hydroxynaphthalenecarboxylic acid, terephthalic acid, hydroquinone and p-aminophenol. However, these polyester amides have a glass transition temperature of about 105° C. The same is true of the polyester amides disclosed in U.S. Pat. No. 4,351,917, which are based on p-aminobenzoic acid, p-hydroxybenzoic acid and hydroxynaphthalenecarboxylic acid. U.S. Pat. No. 4,473,681 even discloses polyester carbamides which are based on hydroxynaphthalenecarboxylic acid, dihydroxyaryl compounds and N,N'-bis(carboxyphenyl)urea. However, the polyester carbamides obtained, which have a glass transition temperature of 120° C. are not sufficiently heat distortion resistant.

It is an object of the present invention to provide wholly aromatic polyester carbamides which form a liquid-crystalline fiber-forming melt below 300° C. and thus are easily processable and which moreover have a high heat distortion resistance and a high abrasion resistance.

We have found that this object is achieved with wholly aromatic polyester carbamides which form a liquid-crystalline fiber-forming melt below 300° C. and are composed of (a) not less than 20 mol % of repeat units of the formula I

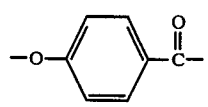

(b) from 5 to 15 mol % of repeat units of the formula II

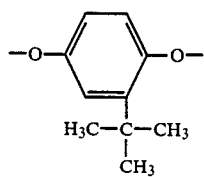

(c) from 5 to 15 mol % of repeat units of the formula III

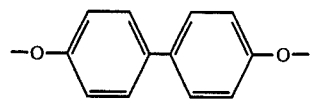

(d) from 1 to 10 mol % of repeat units of the formula IV

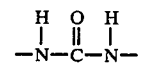

(e) a molar amount corresponding to the total amount of components (b), (c) and (d) of repeat units of the formula V

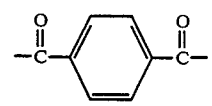

the mol percentages of components (a), (b), (c), (d) and (e) adding up to 100 mol % in each case.

The novel polyester carbamides have the advantage of forming a liquid-crystalline fiber-forming melt below 300° C. and hence of being easily processable below 300° C. The novel polyester carbamides also have the advantage of having a high heat distortion resistance and excellent mechanical properties. The novel polyester carbamides also have the advantage of having a smooth abrasion-resistant surface.

The liquid-crystalline state of the polyester carbamides can be detected with a polarization microscope by a method described in German Published Application DAS 2,520,819. Applied in a thickness of 10 μm between glass plates and viewed between crossed polarizers, the polymer melts have textures which can be ascribed to a mesomorphic phase.

The polyester carbamides according to the invention are composed of (a) not less than 20 mol % of repeat units of the formula (I)

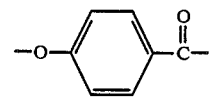

a suitable starting compound being for example p-hydroxybenzoic acid, (b) from 5 to 15 mol % of repeat units of the formula (II)

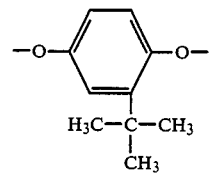

a suitable starting compound being for example t-butylhydroquinone, (c) from 5 to 15 mol % of repeat units of the formula (III)

III a suitable starting compound being for example 4,4'-dihydroxybiphenyl, (d) from 1 to 10 mol % of repeat units of the formula (IV)

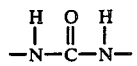

IV a preferred starting compound being urea, (e) a molar amount corresponding to the total of (b), (c) and (d) of repeat units of the formula V

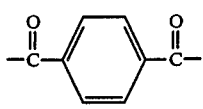

V a suitable compound being for example terephthalic acid. It will be readily understood that the mole percentages of components (a), (b), (c), (d) and (e) add up to 100 mol % in each case.

Advantageously some of the repeat units of the formula II in component (b) are replaced by (f) repeat units of the formula VI

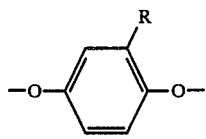

VI where R is $C_1$–$C_4$-alkyl (except tertiary butyl), halogen or phenyl which may contain methyl groups as substituents.

Suitable starting compounds are for example methylhydroquinone, ethylhydroquinone, isopropylhydroquinone, chlorohydroquinone or phenylhydroquinone.

Advantageously the repeat units of the formula VI are present in an amount of from 2 to 10 mol %.

It has further been found to be advantageous for the molar proportion of the total amount of components (b) and (d) in the polyester carbamides to be from 15 to 20 mol %.

In other advantageous polyester carbamides, some of component (c) is replaced by one or more of the repeat units of the formulae VII, VIII or IX

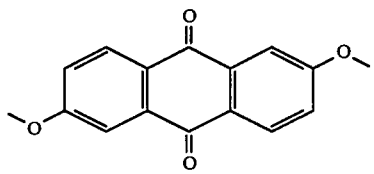

VII

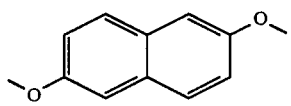

VIII

-continued

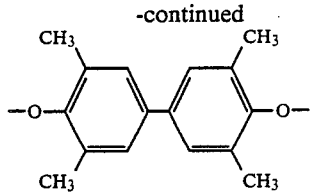

IX a suitable starting compound for the repeat units of the formula VII is, for example, 2,6-dihydroxyanthraquinone, for repeat units of the formula VII 2,6-dihydroxynaphthalene and for repeat units of the formula IX 3,3',5,5'-tetramethyl-4,4'-dihydroxybiphenyl. Advantageously the proportion of repeat units of the formulae VII, VIII and/or IX is from 2 to 10 mol %.

Preferred wholly aromatic liquid-crystalline polyester carbamides have a glass transition temperature Tg of $\geq 160°$ C., in particular $\geq 170°$ C. The glass transition temperature is measured by the DSC method described by K. A. Illers et al. in Makromol. Chem. 127 (1969), 1 ff. The wholly aromatic liquid-crystalline polyester carbamides form a liquid-crystalline fiber-forming melt at $<300°$ C., in particular $<290°$ C. Preference is also given to liquid-crystalline polyester carbamides which have partial crystallinity at $>220°$ C. and $<280°$ C.

The liquid-crystalline polyester carbamides according to the invention are obtainable for example in a manner similar to that described in U.S. Pat. Nos. 4,375,530 and 4,118,372. The mass condensation generally includes an alkanoylating step, in which the monomers used are reacted with acid anhydrides, and a polymerization step, in which the polycondensate is formed by elimination of aliphatic carboxylic acids. Processes which include a prepolymerization step can be found in German Laid-Open Application DOS No. 3,320,118. However, the processes described require reaction times of more than 10 hours.

In an advantageous embodiment, the polyester carbamides according to the invention are obtained in a single-stage process by converting the underivatized starting materials in the molar ratio described using anhydrides of lower fatty acids, for example fatty acids of 2 to 4 carbon atoms, in particular acetic anhydride. This reaction may be catalyzed with from 0.001 to 1 mol % of catalysts of the type customary for polycondensation. In the reaction, the underivatized starting materials are heated together with the fatty acid anhydride, which is advantageously present in a molar excess of at least 5%, based on the hydroxyl and amino groups present, with stirring in an inert gas atmosphere to a temperature at which reflux occurs. Advantageously the temperature is increased in stages, for example to 130°–170° C. in not more than 5 hours, preferably up to 2 hours. The temperature is then raised to 250°–350° C., for example in the course of 2–2½ hours, while excess fatty acid anhydrides and fatty acids are distilled off. To complete the reaction, it has been found to be advantageous to employ reduced pressure, for example as low as 0.5 mbar, toward the end of the reaction.

It is a remarkable and unforeseeable feature of this single-stage process that the desired polymers are obtained in a relatively short time in a troublefree and complete reaction even without catalysts. This is all the more astonishing as the large number of chemically different hydroxyl groups and in particular the use of urea would be expected to lead to differences in reactivity and hence to inadequate polymer synthesis.

The wholly aromatic liquid-crystalline polyester carbamides thus obtained, after the condensation in the melt, are advantageously further condensed in the solid state, for example at 150°–250° C., until the desired viscosity is obtained. This postcondensation in solid phase can take place not only before but also after thermoplastic processing. The solid phase condensation is advantageously carried out in an inert gas atmosphere, for example nitrogen.

The polyester carbamides according to the invention may contain conventional additives and assistants in active amount. Conventional additives are for example stabilizers against degradation by molecular oxygen, heat or UV light, for example sterically hindered phenols, hydroquinones, substituted resorcinols, salicylates, benzotriazoles or benzophenones.

Other suitable additives are dyes and pigments such as nigrosine, titanium dioxide and phthalocyanines.

Suitable additives also include fibrous and pulverulent fillers and reinforcing agents in amounts of up to 70% by weight, such as carbon fibers, glass fibers, amorphous silica, asbestos, calcium silicate, aluminum silicate, magnesium carbonate, chalk or feldspar.

The wholly aromatic liquid-crystalline polyester carbamides according to the invention are suitable for preparing filaments, films, foams and industrial moldings by injection molding, pressing or extruding. The moldings prepared from the polyester carbamides according to the invention have excellent mechanical properties, such as stiffness and strength. They are substantially resistant to chemicals and flame-retardant. They also have a high heat distortion resistance and a smooth, abrasion-resistant surface. The polyester carbamides according to the invention are therefore highly suitable for preparing moldings for electrical engineering, data processing, automotive construction and other industrial sectors. But they can also be used as surface coating materials, in pulverulent dispersion or as film.

The invention is illustrated by the following Examples.

EXAMPLE 1

0.2 mol of terephthalic acid, 0.26 mol of 4-hydroxybenzoic acid, 0.16 mol of t-butylhydroquinone, 0.02 mol of 4,4'-dihydroxybiphenyl, 0.02 mol of urea, and 0.86 mol of acetic anhydride are weighed into a flask equipped with a stirrer, nitrogen inlet and distillation attachment, and under nitrogen are heated in a metal bath to 100° C. The temperature is then raised to 150° C., in 30', to 200° C. in a further 100' and finally to 350° C. in 120'.

The pressure is then reduced to 560 mbar and subsequently reduced by half every 10'. The final vacuum is 10 mbar. In this way a highly viscous fiber-forming melt is obtained. Polymer melt and solidifyied polymer have a pearlescent luster. DSC differential scanning calorimetry measurements indicate a glass transition temperature of 181° C. The intrinsic viscosity is 1.1 dl/g, measured at 50° C. in an 0.5% strength by weight solution in 4-chlorophenol.

Viewed between crossed polarizers in a polarization microscope, the polymer shows textures which are typical of LC liquid crystalline polymers.

EXAMPLE 2

0.2 mol of terephthalic acid, 0.26 mol of 4-hydroxybenzoic acid, 0.02 mol of 4,4'-dihydroxybiphenyl, 0.17 mol of t-butylhydroquinone, 0.01 mol of urea and 0.86 mol of acetic anhydride are reacted as in Example 1. The liquid-crystalline polyester carbamide has a glass transition temperature of 181° C. and an intrinsic viscosity of 1.2 dl/g.

EXAMPLE 3

0.2 mol of terephthalic acid, 0.26 mol of 4-hydroxybenzoic acid, 0.17 mol of t-butylhydroquinone, 0.02 mol of 3,3',5,5'-tetramethyl-4,4'-dihydroxybiphenyl, 0.01 mol of urea and 0.86 mol of acetic anhydride are reacted as described in Example 1. The liquid-crystalline polyester carbamide has a glass transition temperature of 175° C. and an intrinsic viscosity of 1.8 dl/g.

I claim:

1. A wholly aromatic polyester carbamide which forms a liquid-crystalline fiber-forming melt below 300° C. and is composed of (a) not less than 20 mol % of repeat units of the formula I

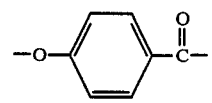

(b) from 5 to 15 mol % of repeat units of the formula II

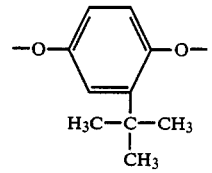

(c) from 5 to 15 mol % of repeat units of the formula III

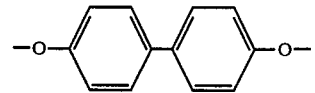

(d) from 1 to 10 mol % of units of the formula IV

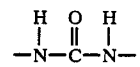

(e) a molar amount corresponding to the total amount of components (b), (c) and (d) of repeat units of the formula V

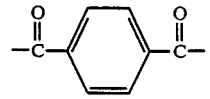

the molar proportions of components (a), (b), (c), (d) and (e) adding up to 100 mol % in each case.

2. A wholly aromatic polyester carbamide as claimed in claim 1, wherein the repeat units of the formula II are replaced to an extent of 2 to 10 mol%, based on the entire repeating units by (f) repeat units of the formula VI

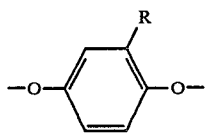

VI where R is $C_1$–$C_4$-alkyl (except tertiary butyl), phenyl or halogen.

3. A wholly aromatic polyester carbamides as claimed in claim 1, wherein the total amount of the components of formulae II and IV is from 15 to 20 mol %.

4. A wholly aromatic polyester carbamide as claimed in claim 1, wherein the repeat units of the formula III are replaced to an extent of 2 to 10 mol%, based on the entire repeating units by one or more of the following repeat units (g) repeat units of the formula VII

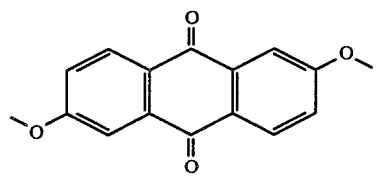

VII (h) repeat units of the formula VIII

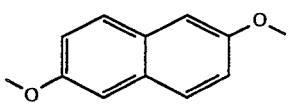

VIII (i) repeat units of the formula IX

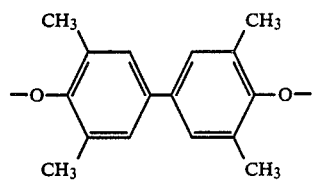

IX

5. A wholly aromatic polyester carbamide as claimed in claim 1, which has a glass transition temperature Tg $\geq 160°$ C.

6. A fiber prepared from a wholly aromatic polyester carbamide as claimed in claim 1.

7. A film prepared from a wholly aromatic polyester carbamide as claimed in claim 1.

8. A molding prepared from a wholly aromatic polyester carbamide as claimed in claim 1.

9. A surface coating material prepared from a wholly aromatic polyester carbamide as claimed in claim 1.

* * * * *